(12) United States Patent
Lim et al.

(10) Patent No.: US 7,790,094 B2
(45) Date of Patent: Sep. 7, 2010

(54) INJECTION MOLDING PROCESS, APPARATUS AND MATERIAL FOR FORMING CURED-IN-PLACE GASKETS

(75) Inventors: Thomas Fay-Oy Lim, Killingworth, CT (US); Hsien-Kun Chu, Wethersfield, CT (US); Mathias E. Liistro, Jr., Plainville, CT (US); Anthony R. Horelik, Farmington, CT (US); Robert P. Cross, Rocky Hill, CT (US); Debora E. Duch, South Glastonbury, CT (US); Alfred A. DeCato, Oakville, CT (US); James E. Lionberger, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 152 days.

(21) Appl. No.: 11/814,590

(22) PCT Filed: Feb. 7, 2006

(86) PCT No.: PCT/US2006/004158

§ 371 (c)(1),
(2), (4) Date: Jul. 24, 2007

(87) PCT Pub. No.: WO2006/086324

PCT Pub. Date: Aug. 17, 2006

(65) Prior Publication Data

US 2008/0128955 A1 Jun. 5, 2008

Related U.S. Application Data

(60) Provisional application No. 60/650,470, filed on Feb. 7, 2005.

(51) Int. Cl.
*B29C 45/00* (2006.01)
(52) U.S. Cl. .................. 264/478; 264/494
(58) Field of Classification Search .......... None
See application file for complete search history.

(56) References Cited

U.S. PATENT DOCUMENTS

| | | | | |
|---|---|---|---|---|
| 5,116,558 | A * | 5/1992 | Wrobel et al. | 264/46.6 |
| 5,332,536 | A * | 7/1994 | Boeckeler | 264/496 |
| 5,597,523 | A | 1/1997 | Sakai et al. | 264/219 |
| 5,686,032 | A | 11/1997 | Mizobe et al. | 264/403 |
| 5,885,514 | A | 3/1999 | Tensor | 264/478 |
| 6,387,303 | B1 | 5/2002 | Jones et al. | 264/401 |
| 7,517,486 | B2 * | 4/2009 | Gottlieb et al. | 264/328.16 |
| 2004/0239008 | A1 | 12/2004 | Gottlieb et al. | 264/494 |
| 2008/0128955 | A1 | 6/2008 | Lim et al. | |

FOREIGN PATENT DOCUMENTS

DE 3445715 A1 6/1986

(Continued)

OTHER PUBLICATIONS

International Search Report for PCT/US2006/004158 dated Jun. 16, 2006.

*Primary Examiner*—Monica A Huson
(74) *Attorney, Agent, or Firm*—Steven C. Bauman; James E. Piotrowski (57) ABSTRACT

The present invention relates to a process for forming a cured-in-place gasket by liquid injection molding. More particularly, the present invention relates to a low pressure and room temperature process for forming a cured-in-place gasket by liquid injection molding.

15 Claims, 2 Drawing Sheets

FOREIGN PATENT DOCUMENTS

| | | |
|---|---|---|
| EP | 1 059 308 | 10/2006 |
| JP | 2007-500633 A | 1/2007 |
| WO | WO 01/00393 A2 | 1/2001 |
| WO | WO 03/021138 A1 | 3/2003 |
| WO | WO 2005/090058 A1 | 9/2005 |
| WO | WO 2006/086324 A1 | 8/2006 |

* cited by examiner

INJECTION MOLDING PROCESS, APPARATUS AND MATERIAL FOR FORMING CURED-IN-PLACE GASKETS

BACKGROUND OF THE INVENTION

1. Field of the Invention

The present invention relates to a process for forming a cured-in-place gasket by liquid injection molding. More particularly, the present invention relates to a low pressure and room temperature process for forming a cured-in-place gasket by liquid injection molding.

2. Brief Description of Related Technology

Cured-in-place gaskets have been formed by liquid injection of a gasket-forming material into a mold. Typical processes include the use of high temperature and/or high pressure liquid injection. For example, a typical process is described in U.S. Pat. No. 5,597,523 to Sakai et al. The molding process and molding device requires use of both an elevated pressure of 24,500 kPa (3,500 psig) and an elevated temperature of 250° C. (480° F.). Upper and lower molds are mated to one to define a mold cavity therebetween. Liquid gasket material, such as epoxy resin or plastic rubber, is pumped into a mold cavity at 2,900 kPa (430 psig). The molds and the gasket material are heated to about 250° C. (480° F.). The gasket material in pumped into the mold cavity. The molds are then clamped together at the elevated pressure of 24,500 kPa (3,500 psig). After the gasket material is cured, the molds and the gasket are cooled to room temperature. The process is described as requiring about one minute to inject and cure the gasket material. The use of such elevated pressures and temperatures at such short cycle times, however, require the use of metallic molds that can withstand such large fluctuations in pressure and temperature while maintaining close tolerances to form the gasket, which make the apparatus and the process expensive and difficult to operate.

U.S. Pat. No. 6,387,303 to Jones et al. describes a molding process and apparatus that avoid the use of elevated temperatures through the use of a gasket-forming material, which is curable at room temperature. The molds and the gasket-forming material is described as being cooled to about 0° C. (32° F.) to avoid polymerization of the room-temperature curable material. The gasket-forming material is described as being a room-temperature curable silicone rubber or an anaerobically curing acrylate compound, which uses temperature cycling to form the gasket.

Thus, there is need for a method for forming gaskets, which does not require the use of high pressures and does not require the cycling of temperatures away from room temperature. There is also a need for actinic radiation curable compositions useful to form gaskets under such conditions.

SUMMARY OF THE INVENTION

In one aspect of the present invention, a method for producing a gasket by liquid injection is provided. The method comprises the steps of providing an actinic radiation curable (meth)acrylate-functionalized poly(meth)acrylate composition; providing an injection mold defining an enclosed gasket-forming cavity and an injection port communicating with the cavity, the mold comprising actinic radiation-conducting means for permitting actinic radiation transmission therethrough; injecting the composition into the mold at temperatures of about 65° C. (150° F.) or less and a pressure of about 1,030 kPa (150 psig) or less to fill the cavity; and transmitting actinic radiation through the radiation-conducting means in a sufficient amount cure the composition in the mold to form a gasket in the gasket-forming cavity.

In another aspect of the present invention, the actinic radiation conducting means may comprise a mold surface which transmits actinic radiation directly therethrough to cure the composition. Desirably, at least a portion of the mold wall comprises a light-transmitting plastic or glass mold.

In still another aspect of the present invention, the actinic radiation conducting means may comprise radiation-conducting channels, which conduct radiation through the mold to the actinic radiation-curing composition. Desirably, the actinic radiation conducting means comprises optic fibers.

Desirably, the injection temperature is from about 10° C. (50° F.) to about 66° C. (150° F.). More desirably, the injection temperature is from about 20° C. (68° F.) to about 50° C. (120° F.), including temperatures from about 20° C. (50° F.) to about 25° C. (77° F.). Even more desirably, the injection temperature is at about room temperature.

Desirably, the injection pressure is from about 140 kPa (20 psig) to about 1,030 kPa (150 psig). More desirably, the injection pressure is less than or equal to about 620 kPa (90 psig), for example, from about 345 kPa (50 psig) to about 620 kPa (90 psig).

Desirably, the radiation exposure lasts for about 5 minutes of less and desirably is predominently radiation in the visible range of the electromagnetic spectrum.

In yet another aspect of the present invention, the poly(meth)acrylate composition may comprise a (meth)acrylate-functionalized poly(acrylate), such as one terminated by (meth)acrylate and including n-butyl acrylate as a segment of the backbone.

Desirably, the poly(meth)acrylate composition is extrudable at a rate of about 50 g/minute to about 500 g/minute, such as through a nozzle having a diameter in the range of about 0.8 mm (1/32 of an inch) to about 9.5 mm (3/8 of an inch), such as 3.2 mm (1/8 of an inch), at a pressure in the range of about of about 140 kPa (20 psig) to about 830 kPa (120 psig), such as of about 690 kPa (90 psig) or less.

Desirably, the poly(meth)acrylate composition has a viscosity of about 100 Pas (10,000 cPs) to about 1,000 Pas (100,000 cPs).

Desirably, the poly(meth)acrylate composition includes at least one monofunctional monomers present in a combined amount of about 8% to about 20% by weight of the total composition.

In another aspect of the present invention, a system for forming a gasket composition at room temperature by low-pressure liquid injection is provided. The system comprises first and second mold members having opposed mating surfaces, wherein at least one of the mating surfaces has a cavity in the shape of a gasket and a port in fluid communication with the cavity and wherein at least one of the mold members transmits actinic radiation therethrough; and a source of actinic radiation, the actinic radiation generated therefrom being transmittable to the cavity when the opposed mating surfaces are disposed in substantial abutting relationship.

In a further aspect of the present invention, the second mold member is a part, such as but not limited to a valve cover or oil pan, where the gasket is adhered by mechanical and/or chemical means to the second mold member. When the first mold member is removed from the assembly, the gasket stays in place on the second mold member to provide a final assembly comprising the cured gasket and part is present as an integral gasket assembly. Such an assembly has an advantage over typical cure-in-place assemblies in that aspect ratios and/or gasket cross sectional shapes can be controlled or specified. As compared to press-in-place gaskets, the present invention eliminates the need to separately form a gasket and subsequently press or otherwise place the gasket on the part.

DETAILED DESCRIPTION OF THE INVENTION

Figure 1:
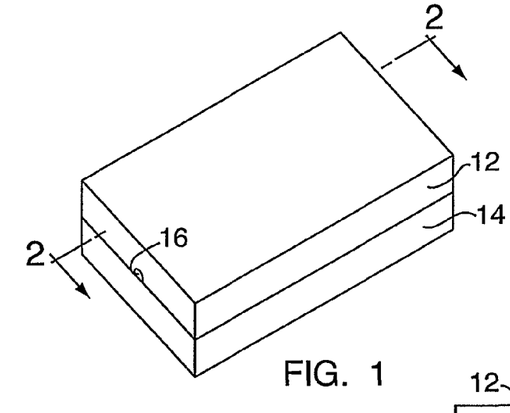
FIG. 1 is a perspective of a mold having a top and a bottom mold member for forming a gasket in accordance with the present invention.
Figure 4:
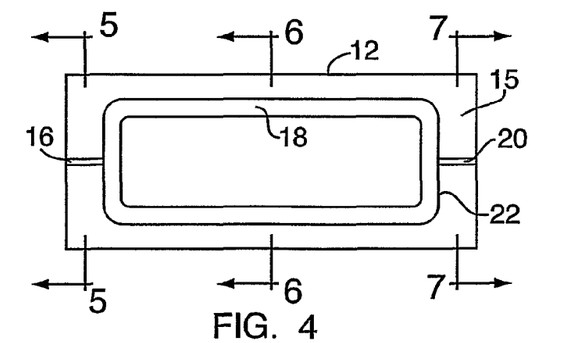
FIG. 4 is a top view of the bottom mold member of FIG. 3 taken along the 4-4 axis.

FIG. 1 is a perspective view of a mold 10 useful for forming cured-in-place gaskets according to the present invention. The mold 10 includes an upper mold member 12, a lower mold member 14, and an injection port 16, inter-related as shown. As depicted in FIG. 4, the injection port 16 is in fluid communication with the mold cavity 18. Due to the low pressure, i.e., less than about 690 kPa (100 psi), and low temperature, i.e., at about room temperature, operation of the present invention, the mold 10 avoids the need for mold members having materials suitable for higher pressures and temperatures. Such materials, such as stainless steel, are often more expensive and more difficult to machine or tool into the mold. Desirably, the mold members 12, 14 of the present invention may suitably be formed from less expensive materials, such as plastics or aluminum. The plastics may include thermoformed plastics.

As used herein the term "room temperature" and its variants refer ambient temperature typical of industrial-settings. Such ambient temperatures are often of a greater range than common usage of the term "room temperature", i.e. from about 20° C. (68° F.) to about 25° C. (77° F.). For example, industrial settings may have ambient temperatures from about 10° C. (50° F.) to about 40° C. (100° F.).

Figure 2:
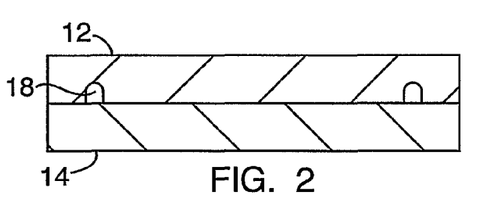
FIG. 2 is a cross-sectional view of the mold of FIG. 1 taken along the 2-2 axis.

FIG. 2 is a cross-sectional view of the mold 10 of FIG. 1 taken along the 2-2 axis. As depicted in FIG. 2, the upper mold member 12 includes a mold cavity 18. Liquid gasket-forming compositions may be introduced into the mold cavity 18 via the injection port 16.

Figure 3:
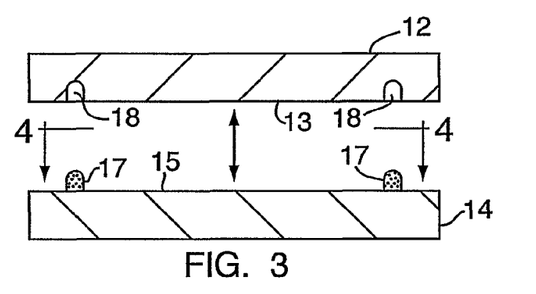
FIG. 3 is an exploded view of the mold of FIG. 2 depicting the top mold member and the bottom mold member.

FIG. 3 is a partial-break-away view of the mold 10 of FIG. 2. Mold member 12 includes a mating surface 13, and mold member 14 includes a mating surface 15. The mold members 12 and 14 may be aligned to one and the other, as depicted in FIG. 2, such that the mating surfaces 13 and 15 are substantially juxtaposed to one and the other. As depicted in FIG. 3 a gasket 17 is removed from the mold cavity 18 and attached to the mating surface 15.

As depicted in FIG. 4, the top view of the mold cavity 18 is in the shape of a closed perimetric design. Although mold cavity 18 is depicted as a rounded rectangle in FIG. 4, the present invention is not so limited and other shaped cavities may suitably be used. Further, while the cross-sectional shape of the mold cavity 18 is depicted as being circular or semi-circular in FIG. 2, the present invention is not so limited and other cross-sectional shapes may suitably be used. Moreover, the present invention is not limited to having the mold cavity 18 in only the upper mold member 12, and either or both mold members 12, 14 may suitably contain the mold cavity.

As depicted in FIG. 4, the mold 12 may contain a second port 20. The second port 20 is in fluid communication with the mold cavity 20. The second port 20 may be used to degas the cavity 18 as it is being filled with the gasket-forming material. As the gasket-forming material in introduced into the cavity 18 via the port 16, air may escape via the second port 20 to degas the mold cavity 20. The size of the second port 20 is not limiting to the present invention. Desirably, the size, i.e., the cross-section extent, of the second port 20 is minimized to allow for the egress of air, but small enough to limit liquid flow of the gasket-forming material therethrough. In other words, the size of the second port 20 may be pin-hole sized where air can flow through while inhibiting substantial flow of liquid gasket-forming material. Further, the present invention is not limited to the use of a single port 16 or a single port 20, and multiple ports may be used for the introduction of the gasket material and/or the venting of air.

Figure 5:
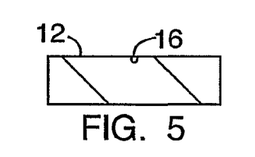
FIG. 5 is a left elevational view of the bottom mold member of FIG. 4 taken along the 5-5 axis.

FIG. 5 is a cross-sectional view of the mold member 12 taken along the 5-5 axis of FIG. 4. As depicted in FIG. 5, the injection port 16 may suitably be a cavity or bore in the mold member 12. The portion of the injection port 16 may be threaded (not shown) or have a valve (not shown) or a tubing or a hose (not shown) through which the gasket-forming material may be delivered.

Figure 6:
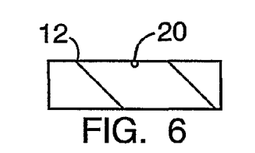
FIG. 6 is a right elevational view of the bottom mold member of FIG. 4 taken along the 6-6 axis.

FIG. 6 is a cross-sectional view of the mold member 12 taken along the 6-6 axis of FIG. 4. As depicted in FIG. 6, the port 20 may suitably be a cavity or bore in the mold member 12. The portion of the port 20 may have a valve (not shown) for controlling the egress of air and/or gasket-forming material.

Figure 7:
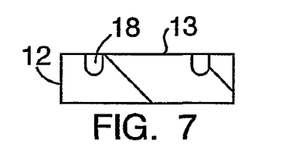
FIG. 7 a cross-sectional view of the bottom mold member of FIG. 4 taken along the 7-7 axis.

FIG. 7 is a cross-sectional view of the mold member 12 taken along the 7-7 axis of FIG. 4. The mold cavity 18 is depicted as extending into the mold member 12 at its mating surface 13.

Figure 8:
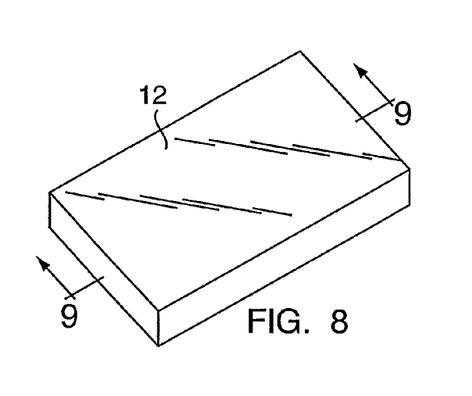
FIG. 8 is a perspective view of the top mold member of FIG. 1 depicting the top mold member having transparent material.
Figure 9:
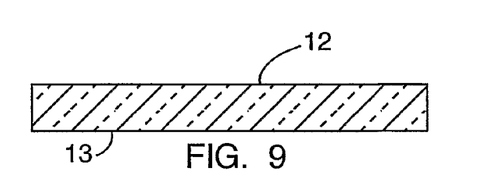
FIG. 9 is a cross-sectional view of the transparent top mold member of FIG. 8 taken along the 9-9 axis.

FIG. 8 is a perspective view of the mold member 12 depicting that the mold member 12 may be made of or may comprise a transparent material. Desirably, the mold member 12 is transparent, i.e., transmissible or substantially transmissible, to actinic radiation, for example ultraviolet (UV) radiation. A cross-sectional view of the transparent mold member 12 is depicted in FIG. 9.

Figure 10:
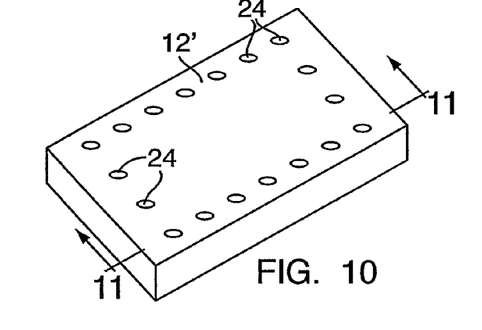
FIG. 10 is a perspective view of the top mold member of FIG. 1 having light transmissible conduits therethrough.
Figure 11:
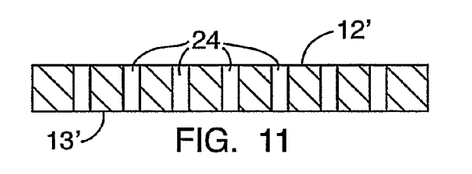
FIG. 11 is a cross-sectional view of the top mold member of FIG. 10 taken along the 11-11 axis depicting the conduits traversing through the top mold member.
Figure 12:
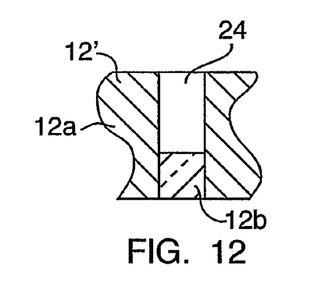
FIG. 12 is a partial side elevational view of another aspect of the top mold member of FIG. 11 depicting a light transmissible conduit terminating at a transparent portion of the top mold member.
Figure 13:
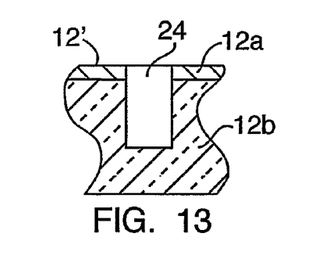
FIG. 13 is a partial side elevational view of another aspect of the top mold member of FIG. 11 depicting a light transmissible conduit disposed within a transparent portion of the top mold member.

FIG. 10 is a perspective view of mold member 12' depicting one or more holes or conduits 24 therethrough. As depicted in FIG. 11 which is a cross-section view of the mold member 12', the conduits 24 may extend completely through the mold member 12'. As depicted in FIGS. 10 and 11, the mold member 12' need not be made of transparent material as the conduits 24 may allow the transmission of the curing UV light or curing actinic radiation (not shown). The present invention, however, is not so limiting. For example as depicted in FIG. 12, the conduit 24 need not extend entirely through the mold member 12'. The conduit 24 may extend only partially through the mold member 12'. Desirably, the portion 12b of the mold member 12' below the conduit 24 is made of transparent material to permit the transmission of actinic radiation therethrough. As depicted in FIG. 12, the remaining portion 12a of the mold member 12' need not be made of a transparent material. Further, the present invention is not limited to partially extending conduits 24 having transparent material 12b proximally located just at the terminus of the conduit 24. For example, as depicted in FIG. 12, significant portions of the mold member 12' may comprise transparent material 12b. Desirably, a top portion 15 of, the mold member 12' comprises non-transparent material 12a.

Figure 14:
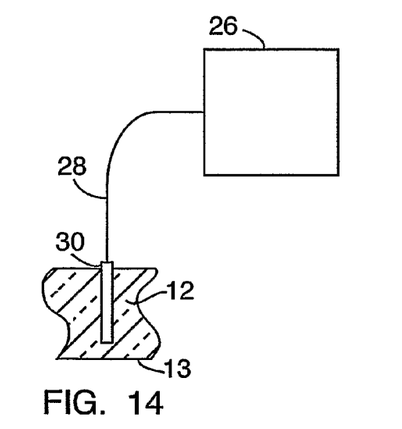
FIG. 14 is a schematic illustration of a light source in communication with the top mold member of the present invention.

A system for delivering actinic radiation is schematically depicted in FIG. 14. A light source 26 generates actinic radiation, such radiation in the visible and/or UV range of the electromagnetic spectrum. The actinic radiation passes through fiber optic cable 28. The cable 28 may be positionable within the mold member 12, 12'. The cable 28 may further include a light guide 30 for releasably securing the light source or cable 28 with the mold member 12.

The present invention provides a method for producing a gasket by liquid injection. The method includes the steps of providing an actinic radiation curable (meth)acrylate functionalized poly(meth)acrylate composition; providing an injection mold 10 defining an enclosed gasket-forming cavity 18 and an injection port 16 communicating with the cavity 18, the mold 10 comprising actinic radiation-conducting means for permitting actinic radiation transmission; injecting the composition in the mold at temperatures of about 50° C. (120° F.) or less and a pressure of about 690 kPa (100 psig) or less to fill the cavity 18; and transmitting a curable amount of actinic radiation through the radiation conducting means of the mold 10 to cure the composition into a gasket. The mold 10 may include at least two members 12, 14, with the two members 12, 14 having opposed mating surfaces 13, 15. As the composition is pumped or otherwise pressurized into the mold cavity 18, the composition may exhibit a higher temperature, i.e., about 50° C. (120° F.) or less, than ambient temperature due to frictional considerations. Such slightly elevated temperatures are below the thermal polymerization temperature of the composition.

Desirably, the gasket-forming material has an extrusion rate of about 50 g/min to about 500 g/min through a 3.2 mm (0.125 inch) nozzle at a pressure of about 620 kPa (90 psig). More desirably, the liquid composition has an extrusion rate of about 100 g/min to about 200 g/min through a 3.2 mm (0.125 inch) nozzle at a pressure of about 620 kPa (90 psig).

The extrusion rate may be determined by industry standard techniques. For example, a testing apparatus may include a sealant gun (Semco® model 250 or equivalent), a cartridge (Semco® model 250-C6 or 250-C8 or equivalent), and a nozzle with a 3.2 mm (0.125 inch) orifice (Semco® 440 or equivalent). Such devices and assemblies thereof are commercially available from Semco Application Systems, Glendale, Calif. After placing the liquid composition in the cartridge, pressure within the cartridge is controlled at 620 kPa (90 psi). The extrusion rate is then determined by weighing the amount of material passed through the nozzle at 620 kPa (90 psi) after 15 seconds.

Compositions with higher extrusion rates are more difficult to process at the low injection pressure of about 690 kPa (100 psig) or less. Composition with lower extrusion rates may not adequately fill the cavity and properly form a gasket therein. Desirably, the liquid composition has a viscosity from about 0.01 Pas (10 centipoise or cPs) to about 1,000 Pas (1,000,000 cPs) at 25° C. (77° F.). More desirably, the liquid composition has a viscosity from about 100 Pas (10,000 cPs) to about 1,000 Pas (100,000 cPs).

Prior to the injecting of the liquid composition the mating surfaces 13, 15 of the mold members 12, 14, respectively, are aligned to define the mold cavity 18. After aligning the mold members 12, 14 may be secured to one the other prior to the step of injecting the gasket-forming composition.

The method of this aspect of the present invention may further include the step of degassing the cavity prior to injecting or while injecting the liquid, actinic radiation curable, gasket-forming composition. Desirably, the step of degassing includes degassing through the second port 20, which is in fluid communication with the cavity 18.

With the degassing of the cavity 18 and with the above-described fluid properties the liquid composition fully fills the cavity 18 without the need for excessive liquid handling pressures, i.e., pressures substantially above 690 kPa (100 psig). Desirably, the liquid composition fully fills the cavity 18 at a fluid handling pressure of about 690 kPa (100 psig) or less.

After the composition is cured or at least partially cured, the mold members 12, 14 may be released from one and the other to expose the gasket, after which the gasket may be removed from the mold cavity 18.

Desirably, the liquid composition is cured at or about room temperature within about 5 minutes or less. More desirably, the liquid composition is cured within 1 minute or less, for example, cured within 30 seconds or less.

The actinic radiation curable composition may be a one-part liquid composition, which may include a volume expansion agent so as to produce a foamed gasket.

Useful materials to form gaskets for the actinic radiation curable composition include actinic radiation curable siloxanes, polyacrylates, polyurethanes, polyethers, polyolefins, polyesters, copolymers thereof and combinations thereof. Desirably, the curable material includes a (meth)acryloyl functionalized material having at least two (meth)acryloyl pendant groups. Desirably, the (meth)acryloyl pendant group is represented by $OC(O)C(R^1)$=$CH_2$, where $R^1$ is hydrogen or methyl. More desirably, the liquid gasket-forming material is a (meth)acryloyl-terminated polyacrylate. The (meth)acryloyl-terminated polyacrylate may desirably have a molecular weight from about 3,000 to about 40,000, more desirably from about 8,000 to about 15,000. Further, the (meth)acryloyl-terminated polyacrylate may desirably have a viscosity from about 2,000 Pas (200,000 cPs) to about 8,000 Pas (800,000 cPs) at 25° C. (77° F.), more desirably from about 4,500 Pas (450,000 cPs) to about 5,000 Pas (500,000 cPs). Details of such curable (meth)acryloyl-terminated materials may be found in European Patent Application No. EP 1 059 308 A1 to Nakagawa et al., and are commercially available from Kaneka Corporation, Japan, such as under the trade designations RC220C, RC210C, RC200C and RC100C. It is believed that the RC220C, RC210C and RC200C are each terpolymers of combinations of substituted and unsubstituted alkylacrylates, such as ethyl acrylate, 2-methoxyethyl acrylate and n-butyl acrylate (varying by molecular weight), whereas the RC100C is a homopolymer of n-butyl acrylate.

Desirably, the liquid composition includes a photoinitiator. A number of photoinitiators may be employed herein to provide the benefits and advantages of the present invention to which reference is made above. Photoinitiators enhance the rapidity of the curing process when the photocurable compositions as a whole are exposed to electromagnetic radiation, such as actinic radiation. Examples of suitable photoinitiators for use herein include, but are not limited to, photoinitiators available commercially from Ciba Specialty Chemicals, under the "IRGACURE" and "DAROCUR" trade names, specifically IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), 819 [bis(2,4,6-trimethyl benzoyl) phenyl phosphine oxide], 2022 [IRGACURE 819 dissolved in DAROCUR 1173 (described below)] and DAROCUR 1173 (2-hydroxy-2-methyl-1-phenyl-1-propan-1-one) and 4265 (the combination of 2,4,6-trimethylbenzoyl-diphenyl-phosphine oxide and 2-hydroxy-2-methyl-1-phenyl-propan-1-one); and the visible light [blue] photoinitiators, dl-camphorquinone and IRGACURE 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., IRGACURE 651), and 2-hydroxy-2-methyl-1-phenyl-1-propane (e.g., DAROCUR 1173), bis(2,4,6-trimethyl benzoyl) phenyl phosphine oxide (e.g., IRGACURE 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., IRGACURE 1700), as well as the visible photoinitiator bis ($\eta^5$-2,4-cyclopentadien-1-yl)-bis[2,6-difluoro-3-(1H-pyrrol-1-yl)phenyl]titanium (e.g., IRGACURE 784DC).

As noted above, useful actinic radiation in connection with the present invention includes ultraviolet light, visible light, and combinations thereof. Desirably, the actinic radiation used to cure the liquid gasket-forming material has a wavelength from about 200 nm to about 1,000 nm. Useful ultraviolet light (UV) includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm.

In addition to the above-described (meth)acrylate functionalized poly(meth)acrylate composition, the composition may further include a (meth)acryloyl-terminated compound having at least two (meth)acryloyl pendant groups selected from (meth)acryloyl-terminated polyethers, meth)acryloyl-terminated polyolefins, (meth)acryloyl-terminated polyurethanes, (meth)acryloyl-terminated polyesters, (meth)acryloyl-terminated silicones, copolymers thereof, and combinations thereof.

The compositions may further include reactive diluents, rubber toughening agents, fillers such as silica fillers, antioxidants and/or mold release agents.

As the reactive diluent, the composition may include a monofunctional (meth)acrylate. Useful monofunctional (meth)acrylates may be embraced by the general structure $CH_2=C(R)COOR^2$ where R is H, $CH_3$, $C_2H_5$ or halogen, such as Cl, and $R^2$ is $C_{1-8}$ mono- or bicycloalkyl, a 3 to 8-membered heterocyclic radial with a maximum of two oxygen atoms in the heterocycle, H, alkyl, hydroxyalkyl or aminoalkyl where the alkyl portion is $C_{1-8}$ straight or branched carbon atom chain. Among the specific monofunctional (meth)acrylate monomers particularly desirable, and which correspond to certain of the structures above, are hydroxypropyl methacrylate, 2-hydroxyethyl methacrylate, methyl methacrylate, tetrahydrofurfuryl methacrylate, cyclohexyl methacrylate, 2-aminopropyl methacrylate, isobornyl methacrylate, isodecyl methacrylate, 2-ethyl hexyl methacrylate and the corresponding acrylates.

In addition, N,N-dimethyl acrylamide ("DMAA") acrylic acid, and -carboxyethyl acrylate (such as is available commercially from Rhodia under the tradename SIPOMER) are usefully employed in the practice of the present invention.

Commercially available representative examples of such reactive diluents include those used in the samples below. More specifically, SARTOMER SR395 (isodecyl acrylate, commercially available from Sartomer Company, Inc., Exton, Pa.), SARTOMER SR495 (caprolactone acrylate, commercially available from Sartomer), SARTOMER SR531 (cyclic trimethylolpropane formal acrylate, commercially available from Sartomer), and SARTOMER PRO6622 (3,3,5 trimethylcyclohexyl acrylate, commercially available from Sartomer) are each appropriate choices, either alone or in combination with each other or with the other noted reactive diluents.

When used, the reactive diluent should be used in the range of 0.5 to about 50 percent by weight, such as about 5 to about 30 percent by weight.

The compositions may also include rubber toughening agents, such as those used in the samples below. More specifically, commercially available ones include VAMAC DP (an ethylene acrylic dipolymer elastomer available commercially from DuPont), HYCAR VTBN (methacrylate-functional acrylonitrile-butadiene-copolymers commercially available from Hanse Chemie), HYPALON 20 (commercially available from DuPont, and reported to be greater than 96% chlorosulfonated polyethylene, less than 0.4% carbon tetrachloride, less than 0.04% chloroform and less than 2% talc), NEOPRENE AD-10 (commercially available from DuPont, and reported to be greater than 98% 2chloro-1,3-butadiene polymers and copolymers, less than 1% water and less than 1% talc), NIPOL IR2200L (commercially available from Zeon, and reported to be greater than 99% polyisoprene polymer), RICACRYL 3100 (commercially available from Sartomer and reported to be a methacrylated polybutadiene low-functional UV-curable resin), and combinations thereof.

When used, the rubber toughening agent should be used in the range of about 0.5 to about 30 percent by weight, such as about 2.5 to about 10 percent by weight.

As the filler, the composition may include silica fillers, such as those available commercially from Cabot Corporation under the tradename CABOSIL or from Wacker under the tradename HDK-2000, each of which are represented in the samples below.

When used, the filler should be used in the range of about 0.5 to about 30 percent by weight, such as about 5 to about 20 percent by weight.

As the antioxidant, the composition may include those available commercially from Ciba Specialty Chemicals under the tradename IRGANOX, representations of which are seen in the several examples in the samples below.

When used, the antioxidant should be used in the range of about 0.1 to about 5 weight percent, such as about 0.3 to about 1 weight percent.

As the mold release agent, the composition may include those available commercially for instance from Crompton Corporation under the tradename MOLD-PRO 678 (a powdered stearic acid).

When used, the mold release agent should be used in the range of about 0.1 to about 5 weight percent, such as about 0.25 to about 0.5 weight percent.

Optionally, or alternatively, a mold release agent may be applied to the cavity 18 prior to the introduction of the liquid composition. The release agent, if needed, helps in the easy removal of the cured gasket from the mold cavity. Useful mold release compositions include, but are not limited to, dry sprays such as polytetrafluoroethylene, and spray-on-oils or wipe-on-oils such as silicone or organic oils. Useful mold release compositions include, but are not limited, to compositions including $C_6$ to $C_{14}$ perfluoroalkyl compounds terminally substituted on at least one end with an organic hydrophilic group, such as betaine, hydroxyl, carboxyl, ammonium salt groups and combinations thereof, which is chemically and/or physically reactive with a metal surface. A variety of mold releases are available, such as those marketed under Henkel's FREKOTE brand. Additionally, the release agent may be a thermoplastic film, which can be formed in the mold shape.

In one aspect of the present invention, the step of providing a source of actinic radiation includes, but is not limited to, the steps of providing at least one of the two mold members 12, 14 as an actinic radiation transmissible member; and transmitting the actinic radiation through the transmissible member. The amount of actinic radiation transmitted through the transmissible member and onto said liquid composition may be detected and monitored. The amount of actinic radiation transmitted onto the liquid composition may be increased when the actinic radiation level declines to a preset minimum. The mating surface of the transmissible member may be simply cleaned when the radiation level declines to the preset minimum to increase actinic radiation transmittance therethrough. Alternatively, the amount of actinic radiation may be controlled by providing the mating surface of the transmissible member with a first removable liner; removing the first removable liner when the radiation level declines to the preset minimum; and providing a second removable liner at the mating surface of the transmissible member to increase actinic radiation transmittance therethrough.

In another aspect of the present invention, the poly(meth)acrylate composition of the present invention may optionally include from about 0% to 90% poly(meth)acrylate polymer or copolymer, from about 0% to about 90% poly(meth)acrylate polymer or copolymer containing at least 2(meth)acrylate functional; from about 0% by weight to about 90% by weight monofunctional and/or multifunctional (meth)acrylate monomers; from about 0% by weight to about 20% by weight photoinitiator; from about 0% by weight to about 20% by weight additives, such as antioxidants; from about 0% by weight to about 20% by weight fillers, such as fumed silica; from about 0% by weight to about 20% by weight rheology modifier; from about 0% by weight to about 20% by weight adhesion promoter; and/or from about 0% by weight to about 20% by weight fluorescent agents or pigments.

More specifically, it is desirable for the composition to be used for forming cured-in-place gaskets to be actinic radiation curable and to include from about 40% to 90% (meth)acrylate-functionalized poly(meth)acrylate polymer; from about 0.5% to about 50% reactive diluent; from about 0.5% to about 10% photoinitiator; and from about 0.5% to about 30% silica filler, wherein the percentages are based on weight percent of the total composition, wherein the composition possesses a viscosity appropriate to permit injection at an injection pressure of about 1,030 kPa (150 psig) or less, and wherein the composition when cured by exposure to radiation in the visible range of the electromagnetic spectrum demonstrates a Durometer, Shore A in the range of 50 to 85 +/−5, tensile strength in the range of 7.5 to 9.0 MPa, elongation in the range of 75 to 250 and modulus at 100% elongation of 2.5 to 3.4 Mpa and a compression set after 70 hours at 150° C. in the range of 25 to 60 percent.

In another aspect of the present invention, an apparatus for forming a gasket at room temperature by liquid injection molding is provided. The system comprises first and second mold members 12, 14 having opposed mating surfaces 13, 15, wherein at least one of the mating surfaces 13, 15 has a cavity 18 in the shape of a gasket and a port 16 in fluid communication with the cavity 18 and wherein at least one of the mold members 12, 14 transmits actinic radiation therethrough; and a source of actinic radiation.

The radiation generated from source is transmittable to the cavity 18 when the opposed mating surfaces 13, 15 are disposed in the substantial abutting relationship. The means for transmitting actinic radiation to the cavity may comprise the use of an actinic radiation transmissible member, whereby the actinic radiation is transmitted directly through the member. The actinic radiation transmissible member may be either or both of the mold members 12, 14. The transmissible member or a portion of the transmissible member may be made from a transmissible thermoplastic material, such as polycarbonate acrylate, and/or may include pathways, such as conduits 24 or fiber optic cables 28, through which the actinic radiation is transmissible or passable.

The apparatus may further include a removable plastic liner abuttingly disposed to the mating surface of the actinic radiation transmissible member, wherein the plastic liner comprises an actinic radiation transmissible material.

In another aspect of the present, one of the mold members having the gasket-shaped cavity is itself an article of manufacture or a part of an article of manufacture, such as an portion of a vehicle, for example a valve cover. The compositions of the present invention may be formed directly on such an article of manufacture or a part thereof by the methods of the present invention. Thus, upon curing the gasket-forming compositions of the present invention and removing the actinic radiation-conducting-mold member, the article or part is produced with an integral gasket, which eliminates the need for mechanically and/or chemically attaching a separately formed gasket.

EXAMPLES

The examples set forth below provide various samples in which different elastomers are evaluated, different reactive diluents are evaluated, different rubber tougheners are evaluated, different fillers are evaluated, different photoinitiators are evaluated, and different antioxidants are evaluated.

For instance, in Table 1 below, various samples are provided with physical property performance given in Table 1A following thereafter.

TABLE 1

| Constituents | | Sample No./Amt (wt %) | | | | |
|---|---|---|---|---|---|---|
| Type | Identity | 1 | 2 | 3 | 4 | 5 |
| Elastomer | KANEKA RC220C[1] | 90 | 70 | — | — | — |
|  | Polyisoprene Diacrylate | — | — | 70 | — | — |
|  | BOMAR BR-7432 GHL[2] | — | — | — | 70 | — |
|  | RAHN GENOMER 4215[3] | — | — | — | — | 70 |
| Rubber Toughener | VAMAC DP[4] | — | 6.5 | 6.6 | 6.5 | 6.5 |
| Antioxidant | IRGANOX 1010[5] | — | 0.3 | — | 0.3 | 0.3 |
| Reactive Diluent | Isobornyl Acrylate | — | 13.2 | — | 13.2 | 13.2 |
|  | SARTOMER SR395[6] | — | — | 13.4 | — | — |
| Silica Filler | CABOSIL TS-530[7] | 8 | 8 | 8 | 8 | 8 |
| Photoinitiator | DAROCUR 4265 | 2 | 2 | 2 | 2 | 2 |

[1]An acrylate-functionalized poly(acrylate) available from Kaneka Corporation.
[2]An aliphatic polyester urethane acrylate available commercially from Bomar Specialties, and having a viscosity of 200,000 cPs @ 50° C., a Tg of −62.0 and when formulated in 30% IBOA and 2 phr IRGACURE 184, an elongation of 550, a durometer hardness of 84A, and a tensile strength of 2880 psi
[3]An aliphatic polyester urethane acrylate available commercially from Rahn USA Corp., Aurora, IL
[4]An ethylene acrylic dipolymer elastomer available commercially from DuPont
[5]Commercially available from Ciba Specialty Chemicals and reported to be a sterically hindered phenolic antioxidant.
[6]Isodecyl acrylate, commercially available from Sartomer Company, Inc., Exton, PA
[7]Commercially available from Cabot Corporation, Billerica, MA, CAB-O-SIL ® TS-530 treated fumed silica is a high-purity silica that has been treated with hexamethyldisilazane. The treatment replaces many of the surface hydroxyl groups on the fumed silica with trimethylsilyl groups, rendering the silica extremely hydrophobic.

TABLE 1A

| | Sample No. | | | | |
|---|---|---|---|---|---|
| Physical Properties | 1 | 2 | 3 | 4 | 5 |
| Shore A | 29 | 43 | 50 | 75 | 95 |
| Tensile, psi | 176 | 364 | 117 | 2080 | 2484 |
| 100% Mod., psi | 114 | 177 | — | 679 | — |
| Elongation, % | 127 | 190 | 34 | 191 | 41 |
| Initial CSR Force, N (S-W) | 124 | 147 | — | 292 | — |
| CSR, % Force Retained (S-W) 70 hrs. @ 150° C. | 16 | 21 | — | 0 | — |

In Sample Nos. 1-5, four different elastomers are evaluated, with Sample Nos. 1 and 2 having the same elastomer—KANEKA RC220C—with (Sample No. 2) and without (Sample No. 1) the rubber toughener, VAMAC DP. The control, Sample No. 1, also does not contain an antioxidant or a reactive diluent, whereas the remaining samples (Nos. 2-5) do.

In the examples, compression strength relaxation ("CSR") is measured in Newtons, and a Shawbury Wallace ("S-W") fixture is used when conducting the evaluation in accordance with ASTM D6147-97.

The results captured in Table 1A show that the elastomers of choice for a gasketing application would be those demonstrating flexibility (as measured by modulus and elongation) and possess the highest retain CSR percent force retained.

In Table 2 below, various samples are provided with physical property performance given in Table 2A following thereafter. These samples (Nos. 1, 2, and 6-8) again vary the elastomer and also vary the reactive diluent.

TABLE 2

| Constituents | | Sample No./Amt (wt %) | | | | |
|---|---|---|---|---|---|---|
| Type | Identity | 1 | 2 | 6 | 7 | 8 |
| Elastomer | BOMAR BR-7432 GHL | — | — | — | 78 | 78 |
|  | KANEKA RC220C | 90 | 70 | 70 | — | — |
| Rubber Toughener | VAMAC DP | — | 6.5 | 6.6 | 6.5 | 6.6 |
| Antioxidant | IRGANOX 1010 | — | 0.3 | — | 0.3 | — |
| Reactive Diluent | Isobornyl Acrylate | — | 13.2 | — | 13.2 | — |
|  | SARTOMER SR495[1] | — | — | 13.4 | — | 13.4 |
| Silica Filler | CABOSIL TS-530 | 8 | 8 | 8 | — | — |
| Photoinitiator | DAROCUR 4265 | 2 | 2 | 2 | 2 | 2 |

[1]Commercially available from Sartomer as a trade designation for caprolactone acrylate.

TABLE 2A

| | Sample No. | | | | |
|---|---|---|---|---|---|
| Physical Properties | 1 | 2 | 6 | 7 | 8 |
| Shore A | 29 | 43 | 28 | 67 | 58 |
| Tensile, psi | 176 | 364 | 163 | 890 | 393 |
| 100% Mod., psi | 114 | 177 | 55 | 489 | — |
| Elongation, % | 127 | 190 | 239 | 155 | 86 |
| Compression Set, % 70 hrs @ 150° C. | 27 | 12 | 21 | 97 | 101 |
| Initial CSR Force, N (S-W) | 124 | 147 | 97 | 251 | — |
| CSR, % Force Retained (S-W) 70 hrs. @ 150° C. | 16 | 21 | 24 | 0 | — |

The results captured in Table 2A show the desired performance properties of flexibility and CSR percent retained forces can be modified and improved through the use of reactive diluents.

In Table 3 below, various samples are provided with physical property performance given in Table 3A following thereafter. These samples (Nos. 9-13) vary the identity and amount of the reactive diluent and the identity of the photoinitiator and silica filler, while including a rubber toughener in Sample Nos. 9-11, but not in Sample Nos. 12 or 13.

TABLE 3

| Constituents | | Sample No./Amt (wt %) | | | | |
|---|---|---|---|---|---|---|
| Type | Identity | 9 | 10 | 11 | 12 | 13 |
| Elastomer | KANEKA RC220C | 70 | 70 | 70 | 71.5 | 71.5 |
| Rubber Toughener | HYCAR VTB[1] | 6.6 | 6.6 | 6.6 | — | — |
| Antioxidant | IRGANOX 1010 | — | — | — | 2.5 | 2.5 |
| Reactive Diluent | Isobornyl Acrylate | 13.4 | — | 6 | 8 | — |
|  | SARTOMER SR395 | — | 13.4 | 7.4 | 8 | 8 |
|  | SARTOMER SR531[2] | — | — | — | — | 8 |
| Silica Filler | CABOSIL TS-530 | 8 | — | — | — | — |
|  | HDK-2000 | — | 8 | 8 | 8 | 8 |
| Photoinitiator | DAROCUR 4265 | 2 | 2 | 2 | — | — |
|  | IRGACURE 819 | — | — | — | 2 | 2 |

[1]Commercially available from Noveon or Hanse Chemie, Hycar ® VTBN grades of methacrylate-functional acrylonitrile-butadiene-copolymers are promoted for use to improve the impact resistance and increase the elongation.
[2]Commercially available from Sartomer as a trade designation for cyclic trimethylolpropane formal acrylate

TABLE 3A

| Physical Properties | Sample No. | | | | |
|---|---|---|---|---|---|
| | 9 | 10 | 11 | 12 | 13 |
| Shore A | 42 | 26 | 28 | 25 | 21 |
| Tensile, psi | 476 | 198 | 163 | 157 | 98 |
| 100% Mod., psi | 215 | — | 72 | 60 | 55 |
| Elongation, % | 196 | 150 | 181 | 210 | 158 |
| Visc., cPs @ 0.5 sec- | — | 178300 | 204020 | 126500 | 115100 |
| Visc., cPs @ 5 sec- | — | 118100 | 136000 | 90550 | 86900 |
| Compression Set, % 70 hrs @ 150° C. | 27 | 27 | 34 | 34 | 13 |
| Initial CSR Force, N (S-W) | 20 | 195 | 196 | 52 | 95 |
| CSR, % Force Retained (S-W) 70 hrs. @ 150° C. | 120 | 5 | 6 | 8 | 28 |

The results in Table 3A indicate that the silica filler HDK-2000 contributes little to the viscosity while providing physical reinforcement to the sample.

In Table 4 below, various samples are provided with physical property performance given in Table 4A following thereafter. These samples (Nos. 14-17) again vary the reactive diluent, though each includes at least fifteen weight percent of DMAA, while using a combination of two different elastomers from Kaneka.

TABLE 4

| Constituents | | Sample No./Amt (wt %) | | | |
|---|---|---|---|---|---|
| Type | Identity | 14 | 15 | 16 | 17 |
| Elastomer | KANEKA RC220C | 42.4 | 42.4 | 50 | 42.9 |
| | KANEKA RC100C | 21.1 | 21.1 | 25 | 21.6 |
| Rubber Toughener | HYCAR VTB | 2.5 | 2.5 | 2.5 | 2.5 |
| Antioxidant | IRGANOX HP2225 FF | 1 | 1 | 1 | 1 |
| Reactive Diluent | DMAA | 20 | 20 | 15 | 20 |
| | Isobornyl Acrylate | 5 | 5 | — | 5 |
| | SARTOMER PRO6622[1] | — | 5 | — | — |
| | SARTOMER SR395 | 5 | 5 | — | 5 |
| | SARTOMER SR531 | — | — | 1.5 | — |
| | 2-Ethyl hexyl acrylate | — | — | 3 | — |
| Silica Filler | HDK-2000 | 2 | 2 | — | — |
| Photoinitiator | IRGACURE 2022[2] | 1 | 1 | — | 2 |
| | IRGACURE 819 | — | — | 2 | — |

[1] Commercially available from Sartomer as a trade designation for 3,3,5 trimethylcyclohexyl acrylate
[2] IRGACURE 819 dissolved in DAROCURE 1173

TABLE 4A

| Physical Properties | Sample No. | | | |
|---|---|---|---|---|
| | 14 | 15 | 16 | 17 |
| Shore A | 52 | 50 | 31 | 36 |
| Tensile, psi | 397 | 403 | 247 | 403 |
| 100% Mod., psi | 126 | 145 | 74 | 92 |
| Elongation, % | 258 | 231 | 249 | 318 |
| Tear Strength, Die C, lbs.-in. | 44.6 | 50.6 | — | 41.4 |
| Visc., cPs @ 0.5 sec- | 5784 | 4893 | 9601 | 8295 |
| Visc., cPs @ 5 sec- | 3317 | 2916 | 7511 | 7504 |
| Cure thru depth, mm | 10+ | 7.7 | — | 7.2 |
| Compression Set, % 70 hrs @ 150° C. | 11 | 11 | 16 | 26 |
| 100 hrs. @ 150° C. | — | — | 20.5 | — |
| Initial CSR Force, N (S-W) | 102 | 82 | 187 | 68 |
| CSR, % Force Retained (S-W) 70 hrs. @ 150° C. | 42 | 34 | 5 | 6 |
| Initial CSR force, N (J-O) | 107 | — | — | 98 |
| CSR, % Force Retained (J-O) 70 hrs. @ 150° C. | 46 | — | — | 55 |
| Initial CSR force, N, Dyneon fixture | 3 | — | — | — |

Tear Strength is elevated in accordance with ASTM D624 and an additional fixture was used in this evaluation, a Jones-Odom ("J-O") fixture. The different fixtures used in this example show measurements of the same forces but in different sample sizes and configurations.

The results in Table 4A indicate that the physical properties can be varied as well as related sealing performance while maintaining a low viscosity suitable for injection at low pressures.

In Table 5 below, various samples are provided with physical property performance given in Table 5A following thereafter. These samples (Nos. 1, 2 and 18-20) vary the identity of the rubber toughener, while using two different reactive diluents and maintaining in the elastomer as KANEKA RC220C.

TABLE 5

| Constituents | | Sample No./Amt (wt %) | | | | |
|---|---|---|---|---|---|---|
| Type | Identity | 1 | 2 | 18 | 19 | 20 |
| Elastomer | KANEKA RC220C | 90 | 70 | 70 | 70 | 70 |
| Rubber Toughener | VAMAC DP | — | 6.5 | — | — | — |
| | HYPALON 20[1] | — | — | 6.6 | — | — |
| | NEOPRENE AD-10[2] | — | — | — | 6.6 | — |
| | NIPOL IR2200L[3] | — | — | — | — | 6.6 |
| Reactive Diluent | Isobornyl Acrylate | — | 13.2 | — | — | — |
| | SARTOMER SR395 | — | — | 13.4 | 13.4 | 13.4 |
| Silica Filler | CABOSIL TS-530 | 8 | 8 | 8 | 8 | 8 |
| Photoinitiator | DAROCUR 4265 | 2 | 2 | 2 | 2 | 2 |

[1] Commercially available from DuPont, and reported to be greater than 96% chloro-sulfonated polyethylene, less than 0.4% carbon tetrachloride and less than 0.04% chloroform and less than 2% talc.
[2] Commercially available from DuPont, and reported to be greater than 98% 2-chloro-1,3-butadiene polymers and copolymers, less than 1% water and less than 1% talc.
[3] Commercially available from Zeon, and reported to be greater than 99% polyisoprene polymer.

TABLE 5A

| Physical Properties | Sample No. | | | | |
|---|---|---|---|---|---|
| | 1 | 2 | 18 | 19 | 20 |
| Shore A | 29 | 43 | 26 | 29 | 27 |
| Tensile, psi | 176 | 364 | 178 | 175 | 81 |
| 100% Mod., psi | 114 | 177 | 62 | 69 | 55 |
| Elongation, % | 127 | 190 | 210 | 205 | 123 |
| Compression Set, % 70 hrs. @ 150° C. | 27 | 12 | 29 | 27 | Not Misible |
| Initial CSR Force, N (S-W) | 124 | 147 | 20 | 20 | — |
| CSR, % Force Retained (S-W) 70 hrs. @ 150° C. | 16 | 21 | 15 | 10 | — |

The results in Table 5A indicate that the physical properties can be varied as well as related sealing performance while maintaining a low viscosity suitable for injection at low pressures by using various rubber toughening agents that are miscible in the composition.

In Table 6 below, various samples are provided with physical property performance given in Table 6A following thereafter. These samples (Nos. 10, 21-23 and 24) again vary the rubber toughener, while again using two different reactive diluents and silica fillers.

TABLE 6

| Constituents | | Sample No./Amt (wt %) | | | | |
|---|---|---|---|---|---|---|
| Type | Identity | 21 | 22 | 23 | 10 | 24 |
| Elastomer | KANEKA RC220C | 70 | 70 | 70 | 70 | 70 |
| Rubber Toughener | RICACRYL 3100[1] | 6.6 | — | — | — | — |
| | VAMAC DP | — | — | 6.6 | — | — |
| | HYCAR VTB | — | 6.6 | — | 6.6 | 6.6 |
| Reactive Diluent | Isobornyl Acrylate | 13.4 | 13.4 | — | — | 13.4 |
| | SARTOMER SR395 | — | — | 13.4 | 13.4 | — |
| Silica Filler | CABOSIL TS-530 | 8 | 8 | — | — | — |
| | HDK-2000 | — | — | 8 | 8 | 8 |
| Photoinitiator | DAROCUR 4265 | 2 | 2 | 2 | 2 | 2 |

[1]According to the manufacturer, Sartomer, RICACRYL ® 3100 is a methacrylated polybutadiene low-functional UV-curable resin.

TABLE 6A

| | Sample No. | | | | |
|---|---|---|---|---|---|
| Physical Properties | 21 | 22 | 23 | 10 | 24 |
| Shore A | 34 | 42 | 20 | 26 | 42 |
| Tensile, psi | 504 | 476 | 130 | 198 | 476 |
| 100% Mod., psi | 197 | 215 | 47 | — | 215 |
| Elongation, % | 209 | 196 | 219 | 150 | 196 |
| Visc., cPs @ 0.5 sec- | — | — | 188500 | 178300 | — |
| Visc., cPs @ 5 sec- | — | — | 113260 | 118100 | — |
| Compression Set, % 70 hrs. @ 150° C. | 43 | 27 | 21 | 27 | 27 |
| Initial CSR Force, N (S-W) | 115 | 20 | 136 | 159 | 20 |
| CSR, % Force Retained (S-W) 70 hrs. @ 150° C. | 2 | 120 | 18 | 5 | 120 |

In Table 7 below, various samples are provided with physical property performance given in Table 7A following thereafter. These samples (Nos. 11 and 25-26) vary the amount of elastomer and rubber toughener, while maintaining the remaining components constant in terms of identity and amount.

TABLE 7

| Constituents | | Sample No./Amt (wt %) | | |
|---|---|---|---|---|
| Type | Identity | 11 | 25 | 26 |
| Elastomer | KANEKA RC220C | 70 | 74.1 | 71.6 |
| Rubber Toughener | HYCAR VTB | 6.6 | 2.5 | 5 |
| Reactive Diluent | Isobornyl Acrylate | 6 | 6 | 6 |
| | SARTOMER SR395 | 7.4 | 7.4 | 7.4 |
| Silica Filler | HDK-2000 | 8 | 8 | 8 |
| Photoinitiator | IRGACURE 819 | 2 | 2 | 2 |

TABLE 7A

| | Sample No. | | |
|---|---|---|---|
| Physical Properties | 11 | 25 | 26 |
| Shore A | 26 | 26 | 26 |
| Tensile, psi | 163 | 156 | 180 |
| 100% Mod., psi | 72 | 82 | 94 |
| Elongation, % | 181 | 169 | 163 |
| Tear Strength, Die C, lbs.-in. | — | 18.3 | 17.4 |
| Visc., cPs @ 0.5 sec- | 204020 | 172800 | 191200 |
| Visc., cPs @ 5 sec- | 136000 | 126900 | 145200 |
| Compression Set, % 70 hrs. @ 150° C. | 34 | 22 | 38 |
| Initial CSR Force, N (S-W) | 196 | 170 | 178 |
| CSR, % Force Retained (S-W) 70 hrs. @ 150° C. | 6 | 19 | 11 |

In Table 8 below, various samples are provided with physical property performance given in Table 8A following thereafter. These samples (Nos. 1, 6, 8, 23, 27 and 28) vary the amount of KANEKA RC220C elastomer and the identity of reactive diluent and silica filler.

TABLE 8

| Constituents | | Sample No./Amt (wt %) | | | | | |
|---|---|---|---|---|---|---|---|
| Type | Identity | 1 | 27 | 8 | 28 | 6 | 23 |
| Elastomer | KANEKA RC220C | 90 | 70 | 78 | 78 | 70 | 70 |
| Rubber Toughener | VAMAC DP | — | 6.6 | 6.6 | 6.6 | 6.6 | 6.6 |
| Reactive Diluent | SARTOMER SR395 | — | — | — | 13.4 | 13.4 | 13.4 |
| | SARTOMER SR495 | — | 13.4 | 13.4 | — | — | — |
| Silica Filler | CABOSIL TS-530 | 8 | 8 | — | — | 8 | — |
| | HDK-2000 | — | — | — | — | — | 8 |
| Photoinitiator | DAROCUR 4265 | 2 | 2 | 2 | 2 | 2 | 2 |

TABLE 8A

| Physical Properties | Sample No. | | | | | |
|---|---|---|---|---|---|---|
| | 1 | 27 | 8 | 28 | 6 | 23 |
| Shore A | 29 | 26 | 58 | 21 | 28 | 20 |
| Tensile, psi | 176 | 160 | 393 | 134 | 163 | 130 |
| 100% Mod., psi | 114 | 107 | — | 40 | 55 | 47 |
| Elongation, % | 127 | 137 | 86 | 405 | 239 | 219 |
| Visc., cPs @ 0.5 sec- | — | — | — | — | — | 188500 |
| Visc., cPs @ 5 sec- | — | — | — | — | — | 113260 |
| Compression Set, % 70 hrs. @ 150° C. | 27 | 77 | 101 | 21 | 21 | 21 |
| Initial CSR Force, N (S-W) | 124 | — | — | 128 | 97 | 136 |
| CSR, % Force Retained (S-W) 70 hrs. @ 150° C. | 16 | — | — | 24 | 24 | 18 |

In Table 9 below, various samples are provided with physical property performance given in Table 9A following thereafter. These samples (Nos. 1, 2, 6, and 29) vary the amount of the KANEKA RC220C elastomer and the manner by which the rubber toughener is included in the sample.

TABLE 9

| Constituents | | Sample No./Amt (wt %) | | | |
|---|---|---|---|---|---|
| Type | Identity | 1 | 2 | 29 | 6 |
| Elastomer | KANEKA RC220C | 90 | 70 | 68 | 70 |
| Rubber Toughener | 32.5 parts VAMAC DP dispersed in Isobornyl Acrylate | — | — | 20 | — |
| | VAMAC DP | — | 6.5 | — | 6.6 |
| Reactive Diluent | Isobornyl Acrylate | — | 13.2 | — | — |
| Antioxidant | IRGANOX 1010 | — | 0.3 | 2 | — |
| Silica Filler | CABOSIL TS-530 | 8 | 8 | 8 | 8 |
| Photoinitiator | DAROCUR 4265 | 2 | 2 | 2 | 2 |

TABLE 9A

| Physical Properties | Sample | | | |
|---|---|---|---|---|
| | 1 | 2 | 29 | 6 |
| Shore A | 29 | 43 | 40 | 28 |
| Tensile, psi | 176 | 364 | 363 | 163 |
| 100% Mod., psi | 114 | 177 | 160 | 55 |
| Elongation, % | 127 | 190 | 208 | 239 |
| Compression Set, % 70 hrs. @ 150° C. | 27 | 12 | — | 21 |
| Initial CSR Force, N (S-W) | 124 | 147 | — | 97 |
| CSR, % Force Retained (S-W) | 16 | 21 | — | 24 |

In Table 10 below, various samples are provided with physical property performance given in Table 10A following thereafter. These samples (Nos. 23 and 27) vary the identity of the silica filler and the manner by which the rubber toughener is introduced into the sample, with the impact on performance illustrated in Table 10A below.

TABLE 10

| Constituents | | Sample No./Amt (wt %) | |
|---|---|---|---|
| Type | Identity | 27 | 23 |
| Elastomer | KANEKA RC220C | 70 | 70 |
| Rubber Toughener | 32.5 parts VAMAC DP dispersed in Isobornyl Acrylate | 20 | — |
| | VAMAC DP | — | 6.6 |

TABLE 10-continued

| Constituents | | Sample No./Amt (wt %) | |
|---|---|---|---|
| Type | Identity | 27 | 23 |
| Reactive Diluent | SARTOMER SR395 | — | 13.4 |
| Silica Filler | CABOSIL TS-530 | 8 | — |
| | HDK-2000 | — | 8 |
| Photoinitiator | DAROCUR 4265 | 2 | 2 |

TABLE 10A

| Physical Properties | Sample | |
|---|---|---|
| | 27 | 23 |
| Shore A | 26 | 20 |
| Tensile, psi | 160 | 130 |
| 100% Mod., psi | 107 | 47 |
| Elongation, % | 137 | 219 |
| Visc., cPs @ 0.5 sec- | — | 188500 |
| Visc., cPs @ 5 sec- | — | 113260 |
| Compression Set, % 70 hrs. @ 150° C. | 77 | 21 |
| Initial CSR Force, N (S-W) | — | 136 |
| CSR, % Force Retained (S-W) | — | 18% |

In Table 11 below, like Table 4, various samples are provided with physical property performance given in Table 11A following thereafter. These samples (Nos. 13, 16 and 39) again vary the type and amount of reactive diluent, with and without fifteen weight percent of DMAA, while using a combination of two different elastomers from Kaneka.

TABLE 11

| Constituents | | Sample No./Amt (wt %) | | |
|---|---|---|---|---|
| Type | Identity | 13 | 16 | 39 |
| Elastomer | KANEKA RC220C | 71.5 | 50 | 47.5 |
| | KANEKA RC100C | — | 25 | 22 |
| Rubber Toughener | NOVEON VTB | 2.5 | 2.5 | 2.5 |
| Antioxidant | IRGANOX HP2225 FF | — | 1 | 1 |
| Reactive Diluent | DMAA | — | 15 | 15 |
| | Isobornyl Acrylate | — | — | 5 |
| | SARTOMER SR395 | 8 | — | — |
| | SARTOMER SR531 | 8 | 1.5 | — |
| | 2-Ethyl Hexyl Acrylate | — | 3 | — |
| | Acrylic Acid | — | — | 5 |
| Silica Filler | HDK-2000 | 8 | — | — |
| Photoinitiator | IRGACURE 2022 | — | — | 2 |
| | IRGACURE 819 | 2 | 2 | — |

TABLE 11A

| Physical Properties | Sample No. | | |
|---|---|---|---|
| | 13 | 16 | 39 |
| Shore A | 21 | 31 | 62 |
| Tensile, psi | 98 | 247 | 965 |
| 100% Mod., psi | 55 | 74 | 384 |
| Elongation, % | 158 | 249 | 199 |
| Visc., cPs @ 0.5 sec- | 115100 | 9601 | 9240 |
| Visc., cPs @ 5 sec- | 86900 | 7511 | 6361 |

TABLE 11A-continued

| | Sample No. | | |
|---|---|---|---|
| Physical Properties | 13 | 16 | 39 |
| Cure thru depth, mm | — | — | 0.226 |
| Compression Set, % 70 hrss @ 150° C. | 13 | 16 | 65 |
| Initial CSR Force, N (S-W) | 95 | 187 | 100 |
| 70 hrs. @ 150° C. | 28 | 5 | 0 |

In Table 12 below, various samples are provided with physical property performance given in Table 12A following thereafter. These samples (Nos. 14, 17 and 41-42) again vary the type and amount of reactive diluent, with and without fifteen weight percent of DMAA, while using a combination of two different elastomers from Kaneka (apart from Sample No. 42).

TABLE 12

| Constituents | | Sample No./Amt (wt %) | | | |
|---|---|---|---|---|---|
| Type | Identity | 17 | 41 | 14 | 42 |
| Elastomer | KANEKA RC220C | 42.9 | 49.8 | 42.4 | — |
| | KANEKA RC200C | — | — | — | 63.5 |
| | KANEKA RC100C | 21.6 | 25 | 21.1 | — |
| Rubber Toughener | NOVEON VTB | 2.5 | 2.5 | 2.5 | 2.5 |
| Antioxidant | IRGANOX HP2225 FF | 1 | 1 | 1 | 1 |
| Reactive Diluent | DMAA | 20 | 4 | 20 | 20 |
| | Isobornyl Acrylate | 5 | 3.5 | 5 | 5 |
| | SARTOMER SR395 | 5 | 3.5 | 5 | 5 |
| | Acrylic Acid | — | 0.7 | — | — |
| Silica Filler | HDK-2000 | — | 8 | 2 | 2 |
| Photoinitiator | IRGACURE 2022 | 2 | 2 | 1 | 1 |

TABLE 12A

| | Sample No. | | | |
|---|---|---|---|---|
| Physical Properties | 17 | 41 | 14 | 42 |
| Shore A | 36 | 29 | 52 | — |
| Tensile, psi | 403 | 259 | 397 | 566 |
| 100% Mod., psi | 92 | 74 | 126 | 100 |
| Elongation, % | 318 | 249 | 258 | 295 |
| Tear Strength, Die C, lbs.-in. | 41.4 | 22.8 | 44.6 | — |
| Visc., cPs @ 0.5 sec- | 8295 | 299300 | 5784 | — |
| Visc., cPs @ 5 sec- | 7504 | 198100 | 3317 | — |
| Cure thru depth, mm | 7.2 | 6.1 | 10 | — |
| Compression Set, % 70 hrs. @ 150° C. | 26 | 13 | 11 | — |
| Initial CSR Force, N (S-W) | 68 | 83 | 102 | — |
| 70 hrs. @ 150° C. | 6 | 28 | 42 | — |
| Initial CSR force, N(J-O) | 98 | 167 | 107 | 182 |
| CSR, % Force Retained (J-O) | 55 | 46 | 46 | 67 |
| Initial force, N Dyneon | — | — | 3 | 3 |
| % retained 24 hrs 150° C. | — | — | — | 95.7 |
| % retained 70 hrs 150° C. | — | — | — | 43.5 |

In Table 13 below, various samples are provided with physical property performance given in Table 13A following thereafter. These samples (Nos. 15 and 43-45) again vary the type and amount of reactive diluent, with and without rubber toughener and varying the amount of DMAA from between fifteen weight percent to 20 weight percent, while using a combination of two different elastomers from Kaneka (apart from Sample No. 44).

TABLE 13

| Constituents | | Sample No./Amt (wt %) | | | |
|---|---|---|---|---|---|
| Type | Identity | 15 | 43 | 44 | 45 |
| Elastomer | KANEKA RC220C | 42.4 | 47 | — | — |
| | KANEKA RC210C | — | — | 68 | 45.3 |
| | KANEKA RC200C | — | — | — | 22.7 |
| | KANEKA RC100C | 21.1 | 18 | — | — |
| Rubber Toughener | NOVEON VTB | 2.5 | — | — | — |
| Antioxidant | IRGANOX HP2225 FF | 1 | 1 | 1 | 1 |
| Reactive Diluent | DMAA | 20 | 20 | 15 | 15 |
| | SARTOMER PRO6622 | 5 | — | — | — |
| | SARTOMER SR395 | 5 | — | — | — |
| Silica Filler | HDK-2000 | 2 | 10 | 15 | 15 |
| Photoinitiator | IRGACURE 2022 | 1 | 4 | 1 | 1 |

TABLE 13A

| | Sample No. | | | |
|---|---|---|---|---|
| Physical Properties | 15 | 43 | 44 | 45 |
| Shore A | 50 | 60 | 60 | 74 |
| Tensile, psi | 403 | 662 | 626 | 944 |
| 100% Mod., psi | 145 | 274 | 441 | 487 |
| Elongation, % | 231 | 232 | 125 | 172 |
| Tear Strength, Die C, lbs.-in. | 50.6 | — | — | — |
| Visc., cPs @ 0.5 sec- | 4893 | — | 272200 | 579010 |
| Visc., cPs @ 5 sec- | 2916 | — | 68700 | 116250 |
| Cure thru depth, mm | 7.7 | — | — | — |
| Compression Set, % 70 hrs. @ 150° C. | 11 | — | 13 | — |
| Initial CSR Force, N (S-W) | 82 | — | — | — |
| 70 hrs. @ 150° C. | 34 | — | — | — |
| Initial force, N Dyneon | — | — | 91 | — |
| % retained 24 hrs 150° C. | — | — | 49 | — |
| % retained 70 hrs 150° C. | — | — | 44.1 | — |

Depending on the environment in which the engine gasket seal is to be used, the physical property performance of the inventive composition may vary.

Nevertheless, prior to accelerated ageing, the cured properties in certain applications should be according to the following:

| Durometer, Shore A[1] | 85 +/− 5 | 50 +/− 5 | 60 +/− 5 | 50-70 |
|---|---|---|---|---|
| Tensile Strength, Mpa, min[2] | 8.3 | 9.0 | 9.0 | 7.5 |
| Elongation, %, min[3] | 75 | 250 | 180 | 175 |
| 100% Modulus, Mpa, min[4] | 3.4 | 3.0 | 3.0 | 2.5 |

[1]ASTM D2240
[2]ASTM D412C
[3]ASTM D412C
[4]ASTM D412C

And the compression set after 70 hours at 150° C. should be

| Compression Set - 70 hrs. @ 150° C., % max | 60 | 25 | 25 | 40 |
|---|---|---|---|---|

What is claimed is:

1. A method for producing a gasket comprising:
providing an actinic radiation curable (meth)acrylate-functionalized poly(meth)acrylate composition;
providing an injection mold assembly defining an enclosed gasket-forming cavity and an injection port communicating with the cavity, the mold assembly comprising actinic radiation conducting optic fibers for permitting actinic radiation transmission therethrough;

injecting the composition into the cavity at a pressure of about 1,030 kPa (150 psig) or less to fill the cavity;

transmitting actinic radiation through the radiation-conducting optic fibers in a sufficient amount cure the composition in the mold assembly to form a gasket.

2. A method for producing a gasket comprising:

providing an actinic radiation curable (meth)acrylate-functionalized poly(meth)acrylate composition comprising a (meth)acrylate-terminated poly n-butyl acrylate;

providing an injection mold assembly defining an enclosed gasket-forming cavity and an injection port communicating with the cavity, the mold assembly comprising actinic radiation-conducting means for permitting actinic radiation transmission therethrough;

injecting the composition into the cavity at a pressure of about 1,030 kPa (150 psig) or less to fill the cavity;

transmitting actinic radiation through the radiation-conducting means in a sufficient amount cure the composition in the mold assembly to form a gasket.

3. The method of claim 2, wherein the actinic radiation conducting means comprises a mold surface which transmits actinic radiation directly therethrough to cure the composition.

4. The method of claim 2, wherein at least a portion of the actinic radiation-conducting means comprises a light-transmitting plastic or glass.

5. The method of claim 2, wherein the poly(meth)acrylate composition includes at least one two monofunctional monomers present in a combined amount of about 8% to about 20% by weight of the total composition.

6. The method of claim 2, wherein the mold assembly comprises an article of manufacture and the gasket is cured-in-place on the article of manufacture to provide an integral gasket thereon eliminating the need to separately form a gasket and subsequently place the gasket on the article of manufacture.

7. A method for producing a gasket comprising:

providing an actinic radiation curable (meth)acrylate-functionalized poly(meth)acrylate composition prepared from about 40% to 90% (meth)acrylate-functionalized poly(meth)acrylate polymer; from about 0.5% to about 50% reactive diluent; from about 0.5% to about 10% photoinitiator; and from about 0.5% to about 30% silica filler, wherein the percentages are based on weight percent of the total composition;

providing an injection mold assembly defining an enclosed gasket-forming cavity and an injection port communicating with the cavity, the mold assembly comprising actinic radiation-conducting means for permitting actinic radiation transmission therethrough;

injecting the composition into the cavity at a pressure of about 1,030 kPa (150 psig) or less to fill the cavity;

transmitting actinic radiation through the radiation-conducting means in a sufficient amount cure the composition in the mold assembly to form a gasket.

8. A method for producing an integral gasket bonded to an article of manufacture, comprising:

providing a first, actinic radiation opaque mold member comprising the article of manufacture having a gasket surface;

providing a second mold member having a surface defining a gasket-forming cavity and an injection port communicating with the cavity, the mold comprising actinic radiation-conducting means for permitting actinic radiation transmission therethrough and wherein the second mold member comprises a polymer liner abuttingly disposed on the second mold surface;

sealingly contacting the mold members so that the gasket-forming cavity is adjacent to the gasket surface;

injecting an actinic radiation curable composition prepared from a (meth)acrylate-functionalized poly(meth)acrylate material into the cavity at a pressure of about 1,030 kPa (150 psig) or less to fill the cavity;

transmitting actinic radiation through the radiation-conducting means in a sufficient amount to cure the composition in the mold to form a gasket integrally bonded to the gasket surface of the article of manufacture.

9. A method for producing an integral gasket bonded to an article of manufacture, comprising:

providing a first, actinic radiation opaque mold member comprising the article of manufacture having a gasket surface;

providing a second mold member having a surface and an injection, the second mold member comprising a portion permitting actinic radiation transmission therethrough;

sealingly contacting the mold members so that a gasket-forming cavity is formed adjacent to the gasket surface, the gasket-forming cavity fluidly connected to the injection port;

injecting an actinic radiation curable composition prepared from about 40% to about 90% by weight of the composition of (meth)acrylate-functionalized poly(meth)acrylate material; about 0.5% to about 50% by weight of the composition of reactive diluent; and about 0.5% to about 10% of the composition of photoinitiator into the cavity at a pressure of about 1,030 kPa (150 psig) or less to fill the cavity;

transmitting actinic radiation through the radiation-conducting means in a sufficient amount to cure the composition in the mold to form a gasket integrally bonded to the gasket surface of the article of manufacture.

10. The method of claim 9, further comprising removing the second mold member from contact with the first mold member wherein the cured gasket remains bonded to the article gasket surface.

11. The method of claim 9, wherein the article of manufacture comprises a portion of a vehicle.

12. The method of claim 9, wherein the article of manufacture comprises a valve cover or an oil pan.

13. The method of claim 9, wherein the curable composition has a viscosity of about 50 Pas (50,000 cPs) to about 100 kPa (100,000 cPs).

14. The method of claim 9, wherein the second mold member comprises a polymer liner.

15. The method of claim 9, wherein the second mold member surface defines a gasket-forming cavity.

* * * * *